United States Patent
Ohno et al.

(10) Patent No.: US 10,780,634 B2
(45) Date of Patent: Sep. 22, 2020

(54) NOZZLE, PROCESSING APPARATUS, AND ADDITIVE MANUFACTURING APPARATUS

(71) Applicants: Technology Research Association for Future Additive Manufacturing, Chuo-ku (JP); Kabushiki Kaisha Toshiba, Minato-ku (JP); Toshiba Kikai Kabushiki Kaisha, Chiyoda-ku (JP)

(72) Inventors: Hiroshi Ohno, Chuo (JP); Satoshi Tsuno, Ota (JP); Mitsuo Sasaki, Chigasaki (JP); Tomohiko Yamada, Yokohama (JP); Yasutomo Shiomi, Koza (JP); Shimpei Fujimaki, Mishima (JP)

(73) Assignees: Technology Research Association for Future Additive Manufacturing, Chuo-ku (JP); Kabushiki Kaisha Toshiba, Minato-ku (JP); Toshiba Kikai Kabushiki Kaisha, Chiyoda-ku (JP)

(*) Notice: Subject to any disclaimer, the term of this patent is extended or adjusted under 35 U.S.C. 154(b) by 138 days.

(21) Appl. No.: 16/132,683

(22) Filed: Sep. 17, 2018

(65) Prior Publication Data

US 2019/0084226 A1 Mar. 21, 2019

(30) Foreign Application Priority Data

Sep. 19, 2017 (JP) .................................. 2017-179515

(51) Int. Cl.
*B29C 64/209* (2017.01)
*B33Y 10/00* (2015.01)
(Continued)

(52) U.S. Cl.
CPC .......... *B29C 64/209* (2017.08); *B29C 64/153* (2017.08); *B29C 64/371* (2017.08);
(Continued)

(58) Field of Classification Search
CPC ..... B29C 64/20; B29C 64/205; B29C 64/209; B29C 64/264; B29C 64/268;
(Continued)

(56) References Cited

U.S. PATENT DOCUMENTS

| | | | |
|---|---|---|---|
| 7,223,935 B2 | 5/2007 | Wessner | |
| 2015/0343664 A1* | 12/2015 | Liu | ........................ B28B 1/001 419/1 |
| 2018/0257168 A1* | 9/2018 | Coskun | ................ B23K 26/144 |

* cited by examiner

*Primary Examiner* — Joseph S Del Sole
*Assistant Examiner* — Lawrence D. Hohenbrink, Jr.
(74) *Attorney, Agent, or Firm* — Oblon, McClelland, Maier & Neustadt, L.L.P.

(57) ABSTRACT

A nozzle according to one embodiment includes a nozzle unit and a guide surface. A first passage, a second passage, and the guide surface are provided to the nozzle unit. The first passage has a first open end. The second passage has a second open end, and a section that is positioned upstream of the second open end and that extends in a second direction. The guide surface has an edge in a first direction. The guide surface is exposed on the outer side at the edge, is along a third direction at the edge, the third direction being a direction becoming more distanced from an axis than the second direction does, as the third direction is extended further toward the first direction. A flow of fluid ejected from the second open end follows the guide surface, and becomes separated from the nozzle unit at the edge.

12 Claims, 9 Drawing Sheets

(51) Int. Cl.
*B33Y 30/00* (2015.01)
*B29C 64/153* (2017.01)
*B29C 64/371* (2017.01)
B22F 3/105 (2006.01)
B22F 3/24 (2006.01)
B29C 64/20 (2017.01)
B29C 64/268 (2017.01)
B29C 64/165 (2017.01)
B29C 64/205 (2017.01)
B29C 64/264 (2017.01)

(52) U.S. Cl.
CPC ............... *B33Y 10/00* (2014.12); *B33Y 30/00* (2014.12); *B22F 3/1055* (2013.01); *B22F 2003/1056* (2013.01); *B22F 2003/1057* (2013.01); *B22F 2003/247* (2013.01); *B22F 2003/248* (2013.01); *B22F 2999/00* (2013.01); *B29C 64/165* (2017.08); *B29C 64/20* (2017.08); *B29C 64/205* (2017.08); *B29C 64/264* (2017.08); *B29C 64/268* (2017.08)

(58) Field of Classification Search
CPC ... B29C 64/371; B29C 64/153; B29C 64/165; B33Y 10/00; B33Y 30/00; B22F 3/1055; B22F 2003/1056; B22F 2003/1057; B22F 2003/247; B22F 2003/248; B22F 2999/00
USPC ...................................... 425/375, 174.4, 166
See application file for complete search history.

US 10,780,634 B2

NOZZLE, PROCESSING APPARATUS, AND ADDITIVE MANUFACTURING APPARATUS

CROSS-REFERENCE TO RELATED APPLICATIONS

This application is based upon and claims the benefit of priority from Japanese Patent Application No. 2017-179515, filed Sep. 19, 2017, the entire contents of which are incorporated herein by reference.

FIELD

Embodiments described herein relate generally to a nozzle, a processing apparatus, and an additive manufacturing apparatus.

BACKGROUND

Having been known is an apparatus such as a laser processing machine or an additive manufacturing apparatus that processes or forms a target object by irradiating the object with energy rays. In order to suppress reactions between the external air with a portion irradiated with the energy rays, the apparatus ejects fluid, such as shielding gas. The shielding gas is ejected in such a manner that the shielding gas surrounds the portion irradiated with the energy rays. A related art example is disclosed in U.S. Pat. No. 7,223,935.

When the ejected shielding gas hits the object that is being processed, for example, a turbulence might occur in the shielding gas. Due to the generation of a turbulence, the external air may get inside the shielding gas.

One exemplary challenge to be addressed by the present invention is to provide a nozzle, a processing apparatus, and an additive manufacturing apparatus capable of reducing the chances of the external air getting inside the ejected fluid.

SUMMARY

According one embodiment, a nozzle includes a nozzle unit and a guide surface. The nozzle unit is provided with a first passage through which an energy ray passes, and a second passage through which fluid passes. The guide surface is provided to the nozzle unit. The first passage extends along an axis, and includes a first open end that is positioned on one end of the first passage in a first direction along the axis, and that opens to outside of the nozzle unit. The second passage includes a second open end that is positioned on one end of the second passage in the first direction, that opens to the outside of the nozzle unit, and that is more distanced from the axis than the first open end is, on an outer side in a radial direction, and a section that is positioned upstream of the second open end, that extends in a second direction, and through which the fluid flows in the second direction. The guide surface has an edge that is positioned on one end of the guide surface in the first direction, is exposed on the outer side in the radial direction at least at the edge, and is along a third direction at the edge, the third direction being a direction becoming more distanced from the axis than the second direction does, as the third direction is extended further toward the first direction. The guide surface allows a flow of the fluid in the second passage or a flow of the fluid ejected from the second open end to follow the guide surface and to become separated from the nozzle unit at the edge.

DETAILED DESCRIPTION

First Embodiment

A first embodiment will now be explained with reference to FIGS. 1 to 5. Basically, in the description herein, a vertically upward direction is defined as an upward direction, and a vertically downward direction is defined as a downward direction. Furthermore, in the description herein, a plurality of expressions are sometimes used for a component according to the embodiment, or for an explanation of the component. It is also possible to use any expressions other than those mentioned herein for a component or an explanation for which a plurality of expressions are used. Furthermore, it is also possible to use any expressions other than those mentioned herein for a component and an explanation of the component for which a plurality of expressions are not used.

Figure 1:
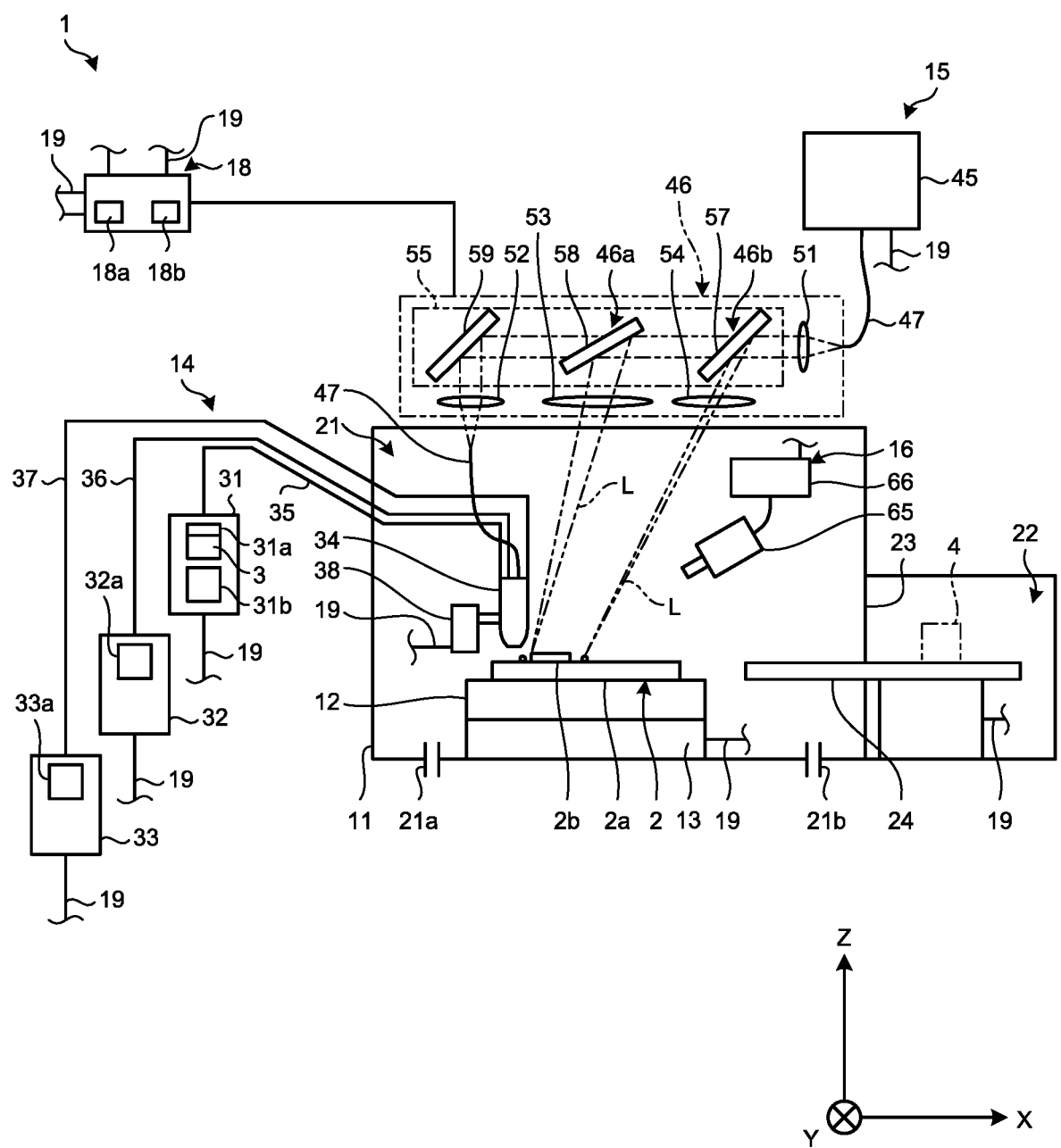
FIG. 1 is an exemplary schematic of an additive manufacturing apparatus according to a first embodiment.

FIG. 1 is an exemplary schematic of an additive manufacturing apparatus 1 according to the first embodiment. The additive manufacturing apparatus 1 is one example of a processing apparatus and an additive manufacturing apparatus. The additive manufacturing apparatus 1 according to the first embodiment is a three-dimensional printer using laser material deposition. The additive manufacturing apparatus 1 is not limited to this example.

The additive manufacturing apparatus 1 additively manufactures a manufactured object 4 having a predetermined shape, by laying layers of powder material 3 onto an object 2, for example. As illustrated in FIG. 1, the additive manufacturing apparatus 1 includes a processing basin 11, a stage 12, a moving device 13, a nozzle device 14, an optical device 15, a measurement device 16, a control device 18, and a plurality of signal lines 19.

In the description herein, an X axis, a Y axis, and a Z axis are defined, as illustrated in the drawings. The X axis, the Y axis, and the Z axis perpendicularly intersecting with one another. The Z axis lies along a vertical direction, for example. The additive manufacturing apparatus 1 may be positioned in such a manner that the Z axis is inclined with respect to the vertical direction.

The material 3 is fed from the nozzle device 14 and laid in layers on the object 2. The material 3 is thermoplastic resin powder, for example. The material 3 is not limited to this example, and may be any other materials, such as another type of synthetic resin, metal, or ceramic. The additive manufacturing apparatus 1 may additively manufacture the manufactured object 4, using a plurality of types of materials 3.

The object 2 is an object to which the material 3 is fed from the nozzle device 14. The object 2 includes a base 2a and a layer 2b. The base 2a is made of a material that is the same as the material 3. The base 2a may also be made of any other material. The base 2a has a plate-like shape and is placed on the stage 12. The layer 2b is made from the material 3 fed from the nozzle device 14, and is laid in layers on the top surface of the base 2a.

The processing basin 11 is provided with a main chamber 21 and a sub-chamber 22. The stage 12, the moving device 13, a part of the nozzle device 14, and the measurement device 16 are arranged inside the main chamber 21. The sub-chamber 22 is adjacent to the main chamber 21.

A door 23 is provided between the main chamber 21 and the sub-chamber 22. When the door 23 is opened, the main chamber 21 and the sub-chamber 22 communicate with each other, and when the door 23 is closed, the main chamber 21 and the sub-chamber 22 are separated from each other. The main chamber 21 may be air-tightened when the door 23 is closed.

The main chamber 21 is provided with an inlet 21a and an outlet 21b. A gas feeder, for example, that is positioned outside of the processing basin 11 feeds inert gas, such as nitrogen or argon, into the main chamber 21 through the inlet 21a. A gas exhauster device, for example, that is positioned outside of the processing basin 11 exhausts gas from the main chamber 21 through the outlet 21b. The additive manufacturing apparatus 1 may achieve vacuum in the main chamber 21 by exhausting gas from the main chamber 21 through the outlet 21b.

A conveyor device 24 is provided from the main chamber 21 to the sub-chamber 22. The conveyor device 24 conveys the manufactured object 4 processed in the main chamber 21 to the sub-chamber 22. The manufactured object 4 processed in the main chamber 21 becomes housed in the sub-chamber 22. After the manufactured object 4 becomes housed in the sub-chamber 22, the door 23 is closed, and the sub-chamber 22 and the main chamber 21 are separated from each other.

The stage 12 supports the object 2. The stage 12 also supports the additively manufactured object 4. The moving device 13 moves the stage 12 in the three-axial directions that perpendicularly intersect with one another, for example. Furthermore, the moving device 13 may rotate the stage 12 about two axes that perpendicularly intersects with each other.

The nozzle device 14 feeds the material 3 onto the object 2 that is placed on the stage 12. A laser beam L is output from the nozzle device 14 to the material 3 fed and the object 2 placed on the stage 12. The laser beam L is one example of an energy ray.

The laser beam L is output from the nozzle device 14, in parallel with feeding of the material 3. Without limitation to the laser beam L, any other energy ray may be output from the nozzle device 14. The energy ray may be any energy ray as long as the ray is capable of melting or sintering the material, as the laser beam L is, and may be an electron beam or an electromagnetic wave within the ranges of microwaves to ultraviolet, for example.

The nozzle device 14 includes a material feeder device 31, a first fluid feeder device 32, a second fluid feeder device 33, a nozzle 34, a material feeder tube 35, a first fluid feeder tube 36, a second fluid feeder tube 37, and a moving mechanism 38. The nozzle 34 is one example of a nozzle and a nozzle unit. The first fluid feeder device 32 is one example of a fluid feeder device.

The material feeder device 31 feeds the material 3 to the nozzle 34 through the material feeder tube 35. The first fluid feeder device 32 sends fluid to the nozzle 34 through the first fluid feeder tube 36. The second fluid feeder device 33 sends fluid to the nozzle 34 through the second fluid feeder tube 37.

The material feeder device 31 includes a tank 31a and a material feeder unit 31b. The tank 31a stores therein the material 3. The material feeder unit 31b feeds the material 3 in the tank 31a to the nozzle 34 through the material feeder tube 35. Therefore, the material feeder unit 31b is enabled to feed the material 3 onto the object 2 from the nozzle 34.

The material feeder unit 31b feeds the material 3 into the nozzle 34 with carrier gas, for example. The carrier gas is inert gas such as nitrogen or argon. In this manner, the material feeder unit 31b includes, for example, a tank that stores therein the carrier gas, a pump that feeds the carrier gas in the tank to the material feeder tube 35, and a device that feeds the material 3 from the tank 31a into the flow of the carrier gas. The material feeder unit 31b may feed the material 3 into the nozzle 34 using any other means.

The first fluid feeder device 32 includes a first fluid feeder unit 32a. The first fluid feeder unit 32a feeds the shielding gas that is the fluid to the nozzle 34. The shielding gas is inert gas such as nitrogen or argon. In this manner, the first fluid feeder unit 32a includes, for example, a tank that stores therein the shielding gas, and a pump that feeds the shielding gas in the tank into the first fluid feeder tube 36. The first fluid feeder unit 32a may also feed any other fluid such as water to the nozzle 34.

The second fluid feeder device 33 includes a second fluid feeder unit 33a. The second fluid feeder unit 33a feeds purge gas that is fluid to the nozzle 34. The purge gas is inert gas, such as nitrogen or argon. In this manner, the second fluid feeder unit 33a includes, for example, a tank that stores therein purge gas, and a pump that feeds the purge gas in the tank into the second fluid feeder tube 37.

Figure 2:
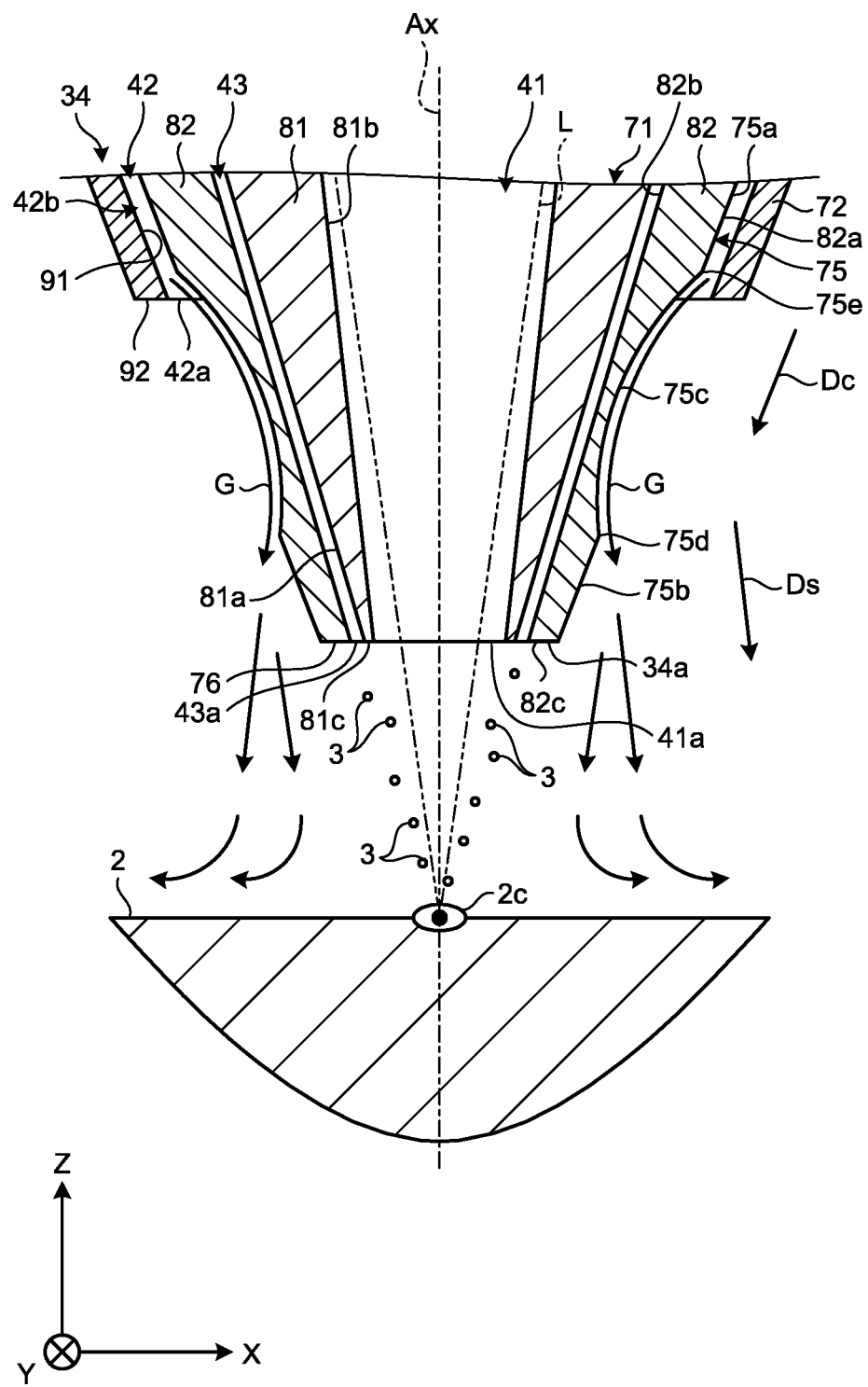
FIG. 2 is an exemplary sectional view illustrating a nozzle and an object according to the first embodiment.

FIG. 2 is an exemplary sectional view illustrating the nozzle 34 and the object 2 according to the first embodiment. As illustrated in FIG. 2, the nozzle 34 has a substantially tubular shape extending along a central axis Ax. The central axis Ax is one example of an axis, and extends along the Z axis. The central axis Ax may also extend diagonally with respect to the Z axis.

A tip 34a of the nozzle 34 is directed toward the object 2 with a space therebetween. The nozzle 34 is provided with a beam output path 41, an ejection path 42, and a feed path 43. The beam output path 41 is one example of a first passage. The ejection path 42 is one example of a second passage. The feed path 43 is one example of a third passage.

The beam output path 41 is a hole extending along the central axis Ax and having a substantially circular cross section. The inner diameter of the beam output path 41 becomes smaller toward the tip 34a. Alternatively, the inner diameter of the beam output path 41 may be constant. The beam output path 41 has a beam output opening 41a. The beam output opening 41a is one example of a first open end.

The beam output opening 41a is positioned on one end of the beam output path 41, in the negative direction of the Z axis (the direction opposite to the arrow indicating the Z axis; the downward direction in FIG. 2). The negative direction of the Z axis is one example of a first direction along a central axis. The beam output opening 41a represents a portion where the beam output path 41 opens to the outside of the nozzle 34, at the tip 34a of the nozzle 34. The laser beam L travels through the beam output path 41 and goes out from the beam output opening 41a.

The beam output path 41 is communicated with the second fluid feeder tube 37 illustrated in FIG. 1. Therefore, the second fluid feeder unit 33a feeds the purge gas into the beam output path 41, through the second fluid feeder tube 37. The purge gas passes through the beam output path 41, together with the laser beam L, and is ejected from the beam output opening 41a.

The ejection path 42 and the feed path 43 are holes that extend along the central axis Ax and having a substantially circular cross section. The ejection path 42 has the central axis Ax as its center, and is provided at a position surrounding the beam output path 41. The feed path 43 is surrounded by the ejection path 42 having the central axis Ax at its center, and is provided at a position surrounding the beam output path 41. In other words, the feed path 43 is positioned between the beam output path 41 and the ejection path 42 in the radial direction of the central axis Ax. The radial direction is a direction that intersects perpendicularly with the central axis Ax.

The ejection path 42 has an ejection opening 42a. The ejection opening 42a is one example of a second open end. The ejection opening 42a is positioned on one end of the ejection path 42 in the negative direction of the Z axis. The ejection opening 42a represents a portion where the ejection path 42 opens to the outside of the nozzle 34. The ejection opening 42a is more distanced from the central axis Ax than the beam output opening 41a is, on the outer side in the radial direction.

The ejection path 42 is communicated with the first fluid feeder tube 36 illustrated in FIG. 1. Therefore, the first fluid feeder unit 32a supplies shielding gas G to the ejection path 42 via the first fluid feeder tube 36. The shielding gas G is one example of fluid. As indicated by the arrow in FIG. 2, the shielding gas G fed by the first fluid feeder unit 32a passes through the ejection path 42 and is ejected from the ejection opening 42a to outside of the nozzle 34.

The feed path 43 has a feed opening 43a. The feed opening 43a is one example of a third open end. The feed opening 43a is positioned on one end of the feed path 43, in the negative direction of the Z axis. The feed opening 43a represents a portion where the feed path 43 opens to the outside of the nozzle 34. The feed opening 43a is more distanced from the central axis Ax than the beam output opening 41a is, on the outer side in the radial direction. Furthermore, the ejection opening 42a of the ejection path 42 is more distanced from the central axis Ax than the feed opening 43a is, on the outer side in the radial direction.

The feed path 43 is communicated with the material feeder tube 35 illustrated in FIG. 1. Therefore, the material feeder unit 31b feeds the powder material 3 and the carrier gas into the feed path 43 in the nozzle 34, via the material feeder tube 35. The material 3 and the carrier gas fed by the material feeder unit 31b pass through the feed path 43 and are ejected from the feed opening 43a toward the object 2.

The moving mechanism 38 illustrated in FIG. 1 moves the nozzle 34 in the three-axial directions that perpendicularly intersect with one another. The moving mechanism 38 may also rotate the nozzle 34 about two axes that perpendicularly intersects with each other. In other words, the moving mechanism 38 moves the nozzle 34 relatively to the stage 12. The moving device 13 also moves the nozzle 34 relatively to the stage 12.

The optical device 15 has a light source 45, an optical system 46, a plurality of cables 47. The light source 45 has an oscillator and emits the laser beam L with the oscillation of the oscillator. The light source 45 can change the power of the laser beam L to be output. The light source 45 may also be enabled to change the wavelength of the laser beam L to be output.

The light source 45 is connected to the optical system 46 via the cables 47 such as hollow fibers. The light source 45 causes the output laser beam L to become incident on the optical system 46 via the cables 47. The laser beam L is passed through the optical system 46 and enters the nozzle 34.

The optical system 46 irradiates the object 2 or the material 3 sprayed toward the object 2 with the laser beam L output from the light source 45, via the beam output path 41 in the nozzle 34. In this manner, the optical device 15 supplies the laser beam L into the beam output path 41 in the nozzle 34, and enables the laser beam L to be output from the beam output opening 41a.

The optical system 46 includes, for example, a first lens 51, a second lens 52, a third lens 53, a fourth lens 54, and a galvano scanner 55. The first lens 51, the second lens 52, the third lens 53, and the fourth lens 54 are fixed. The optical system 46 may be provided with an adjusting device enabled to move the first lens 51, the second lens 52, the third lens 53, and the fourth lens 54 in two-axis directions intersecting (perpendicularly) with the light path, for example.

The first lens 51 collimates the laser beam L that has become incident on the optical system 46 from the light source 45 via the cables 47 to a parallel beam. The collimated laser beam L then becomes incident on the galvano scanner 55.

Each of the second lens 52, the third lens 53, and the fourth lens 54 converges the laser beam L output from the galvano scanner 55. The laser beam L converged by the second lens 52 passes through the cables 47 and reaches the nozzle 34. The object 2 is irradiated with the laser beams L that are converged by the third lens 53 and the fourth lens 54.

The galvano scanner 55 splits the collimate light collimated by the first lens 51 into light to be incident on the second lens 52, light to be incident on the third lens 53, and light to be incident on the fourth lens 54. The galvano scanner 55 includes a first galvano mirror 57, a second galvano mirror 58, and a third galvano mirror 59. The first to the third galvano mirrors 57, 58, 59 are configured to split light, and are enabled to change their inclination angles (output angles).

The first galvano mirror 57 transmits a part of the laser beam L passed through the first lens 51, and outputs the transmitted laser beam L to the second galvano mirror 58. The first galvano mirror 57 reflects the other part of laser beam L, and outputs the reflected laser beam L to the fourth lens 54. The first galvano mirror 57 changes a position to be irradiated with the laser beam L having transmitted the fourth lens 54, based on the inclination angle of the first galvano mirror 57.

The second galvano mirror 58 transmits a part of the laser beam L having transmitted through the first galvano mirror 57, and outputs the transmitted laser beam L to the third galvano mirror 59. The second galvano mirror 58 reflects the other part of the laser beam L, and outputs the reflected laser beam L to the third lens 53. The second galvano mirror 58 changes a position to be irradiated with the laser beam L transmitted through the third lens 53, based on the inclination angle of the second galvano mirror 58.

The third galvano mirror 59 reflects the laser beam L having transmitted through the second galvano mirror 58, and outputs the reflected laser beam L to the second lens 52. The inclination angle of the third galvano mirror 59 is kept constant.

The optical system 46 has a melting device 46a including the first galvano mirror 57, the second galvano mirror 58, and the third lens 53. The melting device 46a forms a layer 2b and performs an annealing process, by heating the material 3 having been supplied to the object 2 from the nozzle 34 by irradiating the material 3 with the laser beam L.

The optical system 46 also has a removing device 46b including the first galvano mirror 57 and the fourth lens 54. The removing device 46b removes an unnecessary part that is formed on the base 2a or the layer 2b, by irradiating that part with the laser beam L.

The removing device 46b removes parts that are not included in a predetermined shape of the manufactured object 4, such as an unnecessary part formed with the material 3 scattered while the material 3 is being fed from the nozzle 34, or formed while the layer 2b is being formed, for example. The removing device 46b outputs the laser beam L at a power capable of removing such unnecessary parts.

The measurement device 16 measures the shape of the solidified layer 2b and the shape of the manufactured object 4 having been manufactured. The measurement device 16 transmits the information of the measured shapes to the control device 18. The measurement device 16 includes, for example, a camera 65 and an image processing apparatus 66. The image processing apparatus 66 performs image processing based on the information measured with the camera 65. The measurement device 16 measures the shapes of the layer 2b and the manufactured object 4 using method such as interferometry or light-section method.

The control device 18 is electrically connected to the moving device 13, the conveyor device 24, the material feeder device 31, the first fluid feeder device 32, the second fluid feeder device 33, the moving mechanism 38, the light source 45, the galvano scanner 55, and the image processing apparatus 66, via the signal lines 19.

The control device 18 includes a control unit 18a such as a central processing unit (CPU), a storage unit 18b such as a read-only memory (ROM), a random access memory (RAM), and a hard disk drive (HDD), and other various types of devices. By causing the CPU to execute a computer program incorporated in the ROM or the HDD, the control unit 18a controls each unit in the additive manufacturing apparatus 1, including the light source 45.

The control unit 18a moves the stage 12 in the three-axial directions by controlling the moving device 13. The control unit 18a conveys the manufactured object 4 having been manufactured to the sub-chamber 22 by controlling the conveyor device 24.

The control unit 18a adjusts to feed or not to feed the material 3, and an amount to be fed, by controlling the material feeder device 31. The control unit 18a adjusts to feed or not to feed the shielding gas G, and an amount to be fed, by controlling the first fluid feeder device 32. The control unit 18a adjusts to feed or not to feed purge gas, and an amount to be fed, by controlling the second fluid feeder device 33.

The control unit 18a controls the position of the nozzle 34 by controlling the moving mechanism 38. The control unit 18a adjusts the inclination angles of the first galvano mirror 57, the second galvano mirror 58, and the third galvano mirror 59 by controlling the galvano scanner 55.

The control unit 18a adjusts the power of the laser beam L output from the light source 45, by controlling the light source 45. The control unit 18a may adjust the wavelength of the laser beam L output from the light source 45 by controlling the light source 45.

A storage unit 18b stores therein data indicating the shape (reference shape) of the object 4 to be manufactured, for example. The storage unit 18b also stores therein data indicating the heights of the nozzle 34 and the stage 12 for each three-dimensional processing position (each point).

The control unit 18a may be provided with a function for selectively feeding a plurality of different materials 3 from the nozzle 34, and adjusting the ratio of the materials 3. This function allows an object to be formed with a graded material in which the ratio of a plurality of materials 3 changes depending on the positions in the manufactured object 4.

The control unit 18a is provided with a function for determining the shape of the layer 2b or the manufactured object 4. For example, the control unit 18a determines whether any part that is not included in the predetermined shape has been formed, by comparing the shape of the layer 2b or the manufactured object 4 acquired by the measurement device 16, with the reference shape stored in the storage unit 18b.

The control unit 18a is also provided with a function for trimming and polishing the layer 2b or the manufactured object 4 into a predetermined shape by removing the unnecessary part, which has been determined to be not included in the predetermined shape as a result of the determination of the shape of the layer 2b or the manufactured object 4. For example, to begin with, the control unit 18a controls the light source 45 in such a manner that the laser beam L output from the fourth lens 54 via the first galvano mirror 57 has such a power enabling the material 3 to evaporate. The control unit 18a then irradiates the part that is not included in the predetermined shape of the layer 2b or the manufactured object 4 with the laser beam L, by controlling the first galvano mirror 57.

Figure 3:
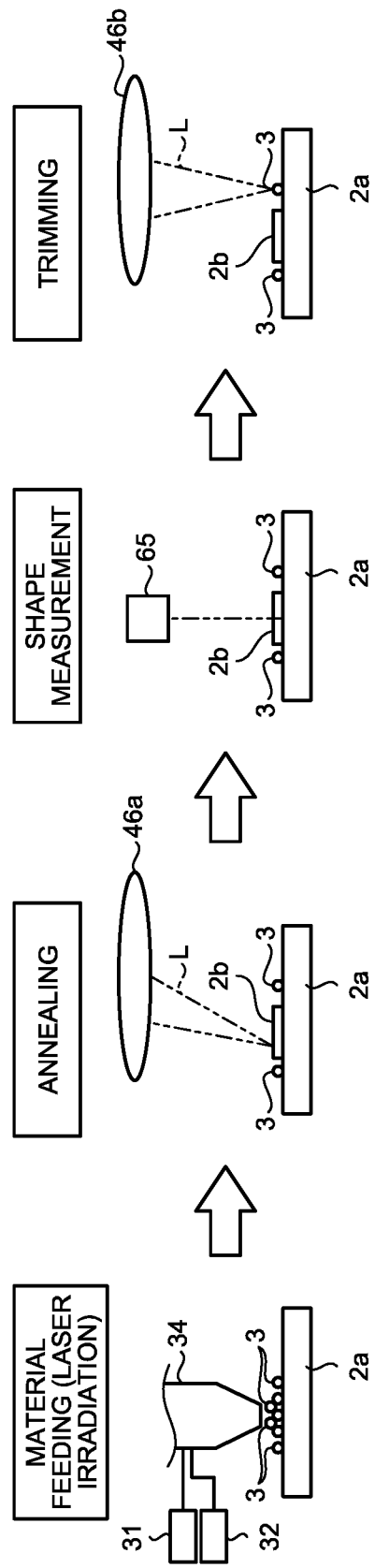
FIG. 3 is an exemplary schematic of one example of the sequence of a manufacturing process performed by the additive manufacturing apparatus according to the first embodiment.

One example of the method for manufacturing the manufactured object 4 using the additive manufacturing apparatus 1 will now be explained with reference to FIG. 3. FIG. 3 is an exemplary schematic of one example of the sequence of the manufacturing process (manufacturing method) performed by the additive manufacturing apparatus 1 according to the first embodiment.

As illustrated in FIG. 3, to begin with, the additive manufacturing apparatus 1 feeds the material 3, and outputs the laser beam L. The control unit 18a controls the material feeder device 31 and the nozzle 34 in such a manner that the material 3 is fed by the nozzle 34 to a predetermined range. The control unit 18a also controls the light source 45 and the optical system 46 in such a manner that the laser beam L melts or sinters the fed material 3.

As illustrated in FIG. 2, the optical system 46 irradiates the material 3 sprayed from the nozzle 34, with the laser beam L via the nozzle 34. The material 3 sprayed from the feed opening 43a of the nozzle 34 is fed to a range in which the layer 2b on the base 2a is to be formed, while being preliminarily heated by the laser beam L output from the beam output opening 41a of the nozzle 34. The material 3 having molten while being scattered is permitted to reach the object 2.

The material 3 supplied to the object 2 become molten or sintered, and aggregates together by being irradiated with the laser beam L. The aggregation of the material 3 forms a molten region 2c. The molten region 2c may include not only the fed material 3 but also a part of the base 2a or the layer 2b irradiated with the laser beam L. The molten region 2c may also include not only the completely molten material 3 but also pieces of partially molten material 3 joined together.

When the molten region 2c solidifies, a layer-like or a thin-film like aggregation of the material 3 is formed on the base 2a or the layer 2b. By being cooled by the thermal transfer to the aggregation of the material 3, the material 3 may be formed into a granular layer, and into a granular aggregation.

The additive manufacturing apparatus 1 then performs an annealing process, as illustrated in FIG. 3. The control unit 18a controls the light source 45 and the melting device 46a in such a manner that the aggregation of the material 3 on the base 2a is irradiated with the laser beam L. The aggregation of the material 3 is melted or sintered again by the laser beam L, and solidifies into a layer 2b. In this manner, the optical system 46 forms a layer 2b of the material 3, by irradiating the material 3 with the laser beam L output from the light source 45 and melting or sintering and solidifying the material 3.

The additive manufacturing apparatus 1 then performs a shape measurement. The control unit 18a controls the measurement device 16 to measure the material 3 on the base 2a after the annealing process. The control unit 18a compares the shape of the layer 2b or the manufactured object 4 acquired by the measurement device 16 with the reference shape stored in the storage unit 18b.

The additive manufacturing apparatus 1 then performs trimming. If it is determined that the material 3 is attached to a position that is different from that in the predetermined shape, on the base 2a, through the comparison between the shape measurement and the reference shape, for example, the control unit 18a controls the light source 45 and the removing device 46b in such a manner that the unnecessary material 3 is caused to evaporate. If the layer 2b is determined to have the predetermined shape through the comparison between the shape measurement and the reference shape, the control unit 18a skips the trimming.

Once the formation of the layer 2b described above is completed, the additive manufacturing apparatus 1 forms another new layer 2b on the layer 2b. The additive manufacturing apparatus 1 manufactures the manufactured object 4 additively, by forming the layers 2b repeatedly.

The nozzle 34 will now be explained more in detail. As illustrated in FIG. 2, the nozzle 34 includes a first tubular portion 71 and a second tubular portion 72. In this embodiment, the first tubular portion 71 and the second tubular portion 72 are separate components. Without limitation to this example, the first tubular portion 71 and the second tubular portion 72 may be provided as one component.

The first tubular portion 71 has a substantially tubular shape that extends along the central axis Ax. The first tubular portion 71 is provided with the beam output path 41 and the feed path 43 of the nozzle 34. The first tubular portion 71 has an outer circumferential surface 75 and a first end surface 76.

The outer circumferential surface 75 faces the outer side of the nozzle 34 in the radial direction. In other words, the outer circumferential surface 75 faces a direction departing from the central axis Ax. The outer circumferential surface 75 has a substantially cylindrical shape having an outer diameter becoming smaller as the distance to the first end surface 76 becomes smaller. The outer circumferential surface 75 is not limited to this example.

In this embodiment, the first end surface 76 forms the tip 34a of the nozzle 34. The tip 34a is not limited to this example. The first end surface 76 is oriented in the negative direction of the Z axis, and faces the object 2 with a space therebetween. The beam output opening 41a and the feed opening 43a both open to the first end surface 76.

The first tubular portion 71 has an inner tubular body 81 and a middle tubular body 82. The inner tubular body 81 and the middle tubular body 82 are separate components. Without limitation to this example, the inner tubular body 81 and the middle tubular body 82 may be provided as one component.

The inner tubular body 81 has a substantially tubular shape that extends along the central axis Ax. The inner tubular body 81 has an outer surface 81a, an inner surface 81b, and an end 81c. The outer surface 81a is a substantially cylindrical surface facing the outer side of the nozzle 34 in the radial direction, and having an outer diameter becoming smaller as the distance to the end 81c becomes smaller. The inner surface 81b is a substantially cylindrical surface facing the inner side of the nozzle 34 in the radial direction, and having an inner diameter becoming smaller as the distance to the end 81c becomes smaller. The end 81c is an end of the inner tubular body 81 in the negative direction of the Z axis, and makes up a part of the first end surface 76 of the first tubular portion 71.

The middle tubular body 82 has a substantially tubular shape that extends along the central axis Ax. The middle tubular body 82 has an outer surface 82a, an inner surface 82b, and an end 82c. The outer surface 82a has a substantially cylindrical shape that faces the outer side of the nozzle 34 in the radial direction, and having an outer diameter becoming smaller as the distance to the end 82c becomes smaller. The outer surface 82a makes up at least a part of the outer circumferential surface 75 of the first tubular portion 71. The inner surface 82b is a substantially cylindrical surface facing the inner side of the nozzle 34 in the radial direction, and having an inner diameter becoming smaller as the distance to the end 82c becomes smaller. The end 82c is an end of the middle tubular body 82 in the negative direction of the Z axis, and makes up a part of the first end surface 76 of the first tubular portion 71.

The outer surface 81a of the inner tubular body 81 and the inner surface 82b of the middle tubular body 82 are inclined by the same angle with respect to the central axis Ax. In other words, the outer surface 81a of the inner tubular body 81 and the inner surface 82b of the middle tubular body 82 are surfaces extending substantially in parallel. The angles by which the outer surface 81a of the inner tubular body 81 and the inner surface 82b of the middle tubular body 82 incline with respect to the central axis Ax may differ.

The beam output path 41 is provided inside the inner tubular body 81. In other words, the inner surface 81b of the inner tubular body 81 defines the beam output path 41. The beam output opening 41a opens to the end 81c of the inner tubular body 81.

The middle tubular body 82 surrounds the inner tubular body 81 with a space therebetween in the radial direction. Therefore, the outer surface 81a of the inner tubular body 81 and the inner surface 82b of the middle tubular body 82 face each other with a space therebetween. The feed path 43 is provided between the outer surface 81a of the inner tubular body 81 and the inner surface 82b of the middle tubular body 82. In other words, the outer surface 81a of the inner tubular body 81 and the inner surface 82b of the middle tubular body 82 define at least a part of the feed path 43.

The second tubular portion 72 may also be referred to as an outer tubular body. The second tubular portion 72 has a substantially tubular shape that extends along the central axis Ax. The second tubular portion 72 surrounds the middle tubular body 82 of the first tubular portion 71 with a space therebetween. In other words, the second tubular portion 72 extends along the central axis Ax, on the outer side of the first tubular portion 71. The second tubular portion 72 has an inner circumferential surface 91 and a second end surface 92.

The inner circumferential surface 91 faces the inner side of the nozzle 34 in the radial direction. In other words, the inner circumferential surface 91 is oriented in a direction approaching the central axis Ax. The inner circumferential surface 91 is a substantially cylindrical surface having an inner diameter becoming smaller as the distance to the second end surface 92 becomes smaller. The inner circumferential surface 91 is not limited to this example.

The second end surface 92 is oriented in the negative direction of the Z axis, and faces the object 2 with a space therebetween. The second end surface 92 is distanced from the first end surface 76 in the positive direction of the Z axis (the direction to which the arrow indicating the Z axis is pointed; an upward direction in FIG. 2).

The inner circumferential surface 91 of the second tubular portion 72 faces the outer circumferential surface 75 of the first tubular portion 71 with a space therebetween. The ejection path 42 is provided between a part of the outer circumferential surface 75 and the inner circumferential surface 91. In other words, a part of the outer circumferential surface 75 and the inner circumferential surface 91 defines at least a part of the ejection path 42.

The outer circumferential surface 75 of the first tubular portion 71 includes a first surface 75a, a second surface 75b, and a guide surface 75c. In other words, the nozzle 34 has the first surface 75a, the second surface 75b, and the guide surface 75c. The first surface 75a is one example of an inner surface. The second surface 75b is one example of a reduced surface.

Each of the first surface 75a, the second surface 75b, and the guide surface 75c makes up a part of the outer circumferential surface 75 and is substantially tubular surface that are continuous along the circumferential direction about the central axis Ax. The circumferential direction is a direction rotating about the central axis Ax.

The first surface 75a, the second surface 75b, and the guide surface 75c are arranged side by side along the central axis Ax. The guide surface 75c is positioned between the first surface 75a and the second surface 75b. The first surface 75a is adjacent to the guide surface 75c in the positive direction of the Z axis. In other words, the first surface 75a is more distanced from the first end surface 76 than the guide surface 75c is. The second surface 75b is adjacent to the guide surface 75c in the negative direction of the Z axis. The second surface 75b is positioned between the first end surface 76 and the guide surface 75c.

Each of the first surface 75a and the second surface 75b extends along the central axis Ax and is substantially cylindrical surface having an outer diameter becoming smaller as the distance to the first end surface 76 becomes smaller. In other words, the first surface 75a and the second surface 75b are conical surfaces that approach nearer to the central axis Ax, as these surfaces are extended further toward the negative direction of the Z axis.

On the cross section including the central axis Ax, as illustrated in FIG. 2, the contour line of the first surface 75a and the contour line of the second surface 75b both extend along the same line that diagonally intersects with the central axis Ax. In other words, the contour line of each of the first surface 75a and the second surface 75b is on an extension of the other, in the cross section including the central axis Ax. The contour line may also be referred to as a generating line or an edge of the cross section, for example. The first surface 75a and the second surface 75b also share a common tangent plane. Therefore, the first surface 75a and the second surface 75b are inclined with respect to the central axis Ax by the same angle of inclination.

The guide surface 75c in this embodiment is a curving surface recessed from the first surface 75a and the second surface 75b that are the other surfaces of the outer circumferential surface 75, in a convex shape curving toward the central axis Ax. In other words, the guide surface 75c is a curving surface recessed from the conical surface that is a virtual extension of the first surface 75a and the second surface 75b, in a convex shape curving toward the central axis Ax. In this manner, the guide surface 75c is one example of a first curving surface having a convex shape curving toward the central axis.

The guide surface 75c has a first edge 75d and a second edge 75e. The first edge 75d is one example of an edge. The first edge 75d is positioned along one end of the guide surface 75c in the negative direction of the Z axis. The second edge 75e is positioned along one end of the guide surface 75c in the positive direction of the Z axis.

The first edge 75d is connected to the second surface 75b. In other words, the second surface 75b extends from the first edge 75d. The second edge 75e is connected to the first surface 75a. In other words, the first surface 75a extends from the second edge 75e.

In the cross section including the central axis Ax, as illustrated in FIG. 2, the guide surface 75c has an arc-shaped contour line. In other words, the guide surface 75c has a contour line that continues smoothly, and that can be expressed as a differentiable function having continuity, in the cross section including the central axis Ax. In other words, the contour line of the guide surface 75c can be expressed as a differentiable function in the X-Z coordinate system defined by the X axis and the Z axis in FIG. 2. The guide surface 75c may have an elliptical arc-shaped contour line or a parabolic contour line, for example. The guide surface 75c is a surface that can be expressed as a totally differentiable function.

In the cross section including the central axis Ax, although the contour line of the first surface 75a and the contour line of the second surface 75b can be expressed as a differentiable function having continuity, the contour line of the entire outer circumferential surface 75 cannot be expressed as a differentiable function having continuity.

In the cross section including the central axis Ax, the contour line of the outer circumferential surface 75 is continuous across the border (the second edge 75e) between the first surface 75a and the guide surface 75c, but is not differentiable. In other words, the first surface 75a and the guide surface 75c are not smoothly continuous.

Furthermore, in the cross section including the central axis Ax, the contour line of the outer circumferential surface 75 is continuous across the border (the first edge 75d) between the second surface 75b and the guide surface 75c, but is not differentiable. In other words, the second surface 75b and the guide surface 75c are not smoothly continuous.

Figure 4:
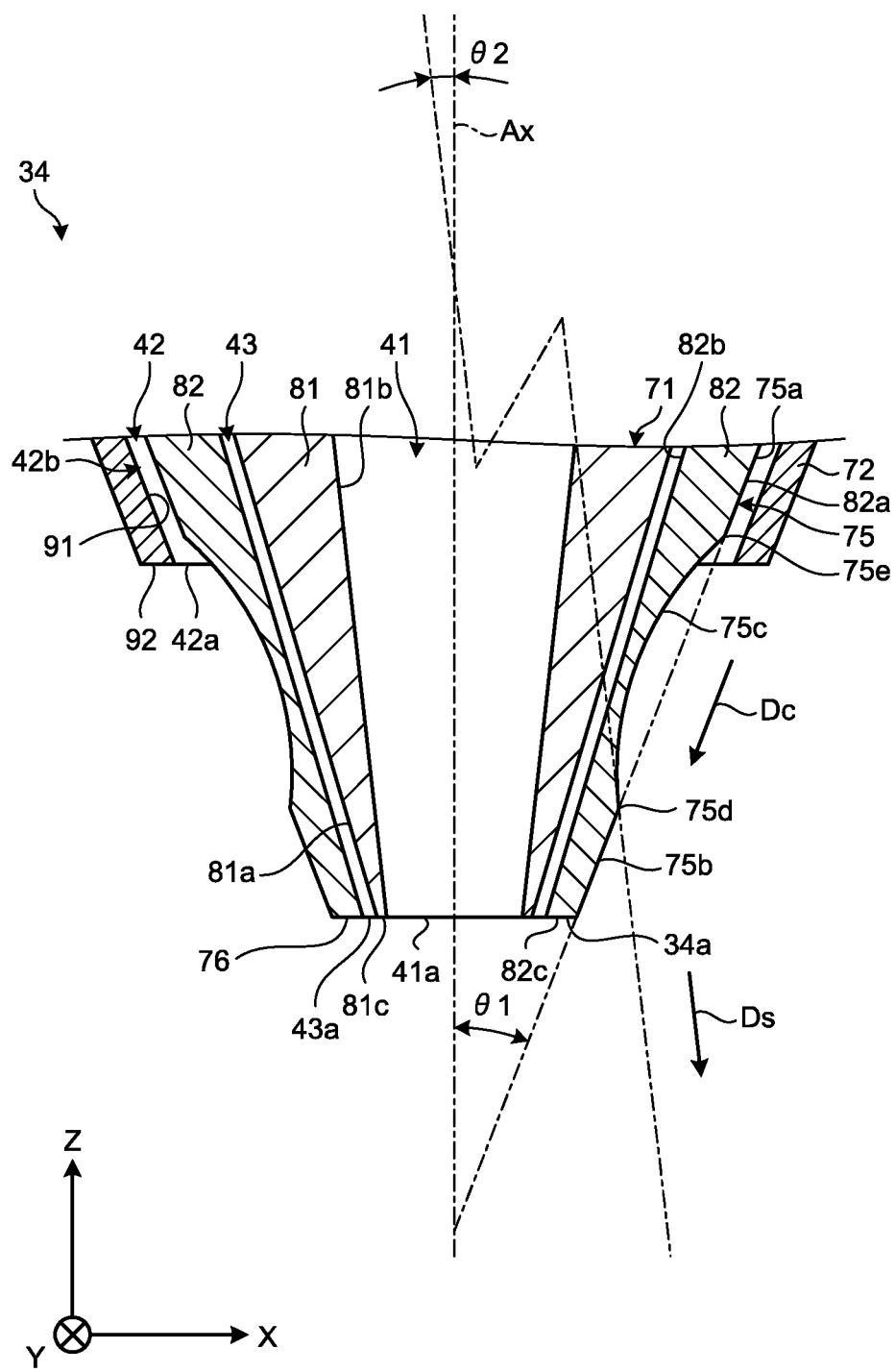
FIG. 4 is an exemplary sectional view illustrating the nozzle according to the first embodiment.

FIG. 4 is an exemplary sectional view illustrating the nozzle 34 according to the first embodiment. In the cross section including the central axis Ax as illustrated in FIG. 4, the contour line of the first surface 75a and the contour line of the second surface 75b are inclined with respect to the central axis Ax by an angle θ1. In other words, the tangent plane on the first surface 75a and the second surface 75b are inclined with respect to the central axis Ax by the angle θ1. Hereinafter, the angle θ1 is handled as a positive angle.

In the cross section including the central axis Ax, the inclination of the contour line of the guide surface 75c with respect to the central axis Ax changes depending on the position in the guide surface 75c. The inclination of the contour line of the guide surface 75c with respect to the central axis Ax in the cross section including the central axis Ax is the inclination of the contour line of the guide surface 75c at each point thereof in the X-Z coordinate system illustrated in FIG. 2.

In this embodiment, in the cross section including the central axis Ax, the inclination of the contour line of the guide surface 75c with respect to the central axis Ax becomes smaller, as the position is moved from the second edge 75e toward the first edge 75d. In other words, the inclination of the tangent plane on the guide surface 75c with respect to the central axis Ax becomes smaller as the point of tangency is moved from the second edge 75e toward the first edge 75d. Using another expression, the angle between the normal vector of the tangent plane at each point on the guide surface 75c and a unit vector in the negative direction of the Z axis increases as the point of tangency is moved further toward the negative direction of the Z axis.

At the first edge 75d, the inclination of the contour line of the guide surface 75c with respect to the central axis Ax is an angle θ2. In other words, the inclination of the tangent plane on the first edge 75d with respect to the central axis Ax is the angle θ2.

The angle θ2 is a negative angle. By contrast, the inclination of the tangent plane on the second edge 75e with respect to the central axis Ax is a positive angle. The inclination of the tangent plane on the second edge 75e with respect to the central axis Ax is greater than the angle θ1 that is the inclination of the tangent plane on the first surface 75a with respect to the central axis Ax. The inclination of the tangent plane on the guide surface 75c with respect to the central axis Ax becomes smaller, becomes parallel with the central axis Ax, and then becomes a negative angle, as the point of tangency is moved from the second edge 75e toward the first edge 75d.

The angle θ2 is smaller than the inclination of the tangent plane on the outer circumferential surface 75 with respect to the central axis Ax, when the point of tangency is positioned more distanced from the first end surface 76 than the first edge 75d. For example, the angle θ2 is smaller than the inclination of the tangent plane on the guide surface 75c with respect to the central axis Ax, when the point of tangency is positioned more distanced from the first end surface 76 than the first edge 75d, and is smaller than the angle θ1 that is the inclination of the tangent plane on the first surface 75a with respect to the central axis Ax. The angle θ2 is not limited to this example.

As mentioned earlier, the guide surface 75c is recessed toward the central axis Ax in a convex shape. Therefore, the guide surface 75c has a curving surface that approaches the central axis Ax once, and then departs from the central axis Ax, as the point of tangency is moved from the second edge 75e toward the first edge 75d. Therefore, the guide surface 75c has a portion that is nearer to the central axis Ax than the first edge 75d is. The tangent plane on the first edge 75d of the guide surface 75c extends in a direction becoming more distanced from the central axis Ax, as the point of tangency is moved toward the negative direction of the Z axis.

The second end surface 92 of the second tubular portion 72 is distanced from the first edge 75d of the guide surface 75c, in the positive direction of the Z axis. The second end surface 92 is distanced from the second edge 75e of the guide surface 75c, in the negative direction of the Z axis. In other words, the second end surface 92 is positioned between the first edge 75d and the second edge 75e of the guide surface 75c in the axial direction along the central axis Ax.

As mentioned earlier, the ejection path 42 is provided between a part of the outer circumferential surface 75 and the inner circumferential surface 91. The ejection path 42 has a conical section 42b. The conical section 42b is one example of a section. The conical section 42b is positioned upstream of the ejection opening 42a and is adjacent to the ejection opening 42a.

The conical section 42b is provided between a part including the first surface 75a and the second edge 75e of the guide surface 75c, within the outer circumferential surface 75 of the first tubular portion 71, and the inner circumferential surface 91 of the second tubular portion 72. In other words, a part of the first surface 75a and the guide surface 75c in the outer circumferential surface 75 of the first tubular portion 71, and the inner circumferential surface 91 of the second tubular portion 72 define the conical section 42b, and are positioned in the conical section 42b.

The conical section 42b is a flow path having a substantially conical shape that extends in a converging direction Dc. The converging direction Dc is one example of a second direction. The section is not limited to this example. The converging direction Dc is a direction that approaches nearer to the central axis Ax, as the direction is extended further toward the negative direction of the Z axis. The shielding gas G fed by the first fluid feeder device 32 illustrated in FIG. 1 flows through the conical section 42b in the converging direction Dc. The inclination of the converging direction Dc with respect to the central axis Ax is the angle θ1 illustrated in FIG. 4.

The guide surface 75c of the first tubular portion 71 and the inner circumferential surface 91 of the second tubular portion 72 define the ejection opening 42a. In other words, the shielding gas G is ejected from the ejection opening 42a that is the gap between the guide surface 75c and the inner circumferential surface 91.

As mentioned earlier, the part including the second edge 75e of the guide surface 75c defines the conical section 42b of the ejection path 42 and is positioned in the conical section 42b of the ejection path 42. By contrast, the part including the first edge 75d of the guide surface 75c is exposed on the outer side in the radial direction. In other words, the guide surface 75c is exposed on the outer side in the radial direction at the first edge 75d. In this manner, the guide surface 75c is continuous from the inside of the ejection path 42 to the outside of the ejection path 42. Therefore, as indicated by the arrow in FIG. 2, the flow of the shielding gas G ejected from the ejection opening 42a follows the guide surface 75c, due to the Coanda effect, for example.

Fluid flows along a surface with a contour line that can be expressed as a differentiable function having a continuity, due to the Coanda effect. Using another expression, fluid flows along a surface that can be expressed as a totally differentiable function. When the fluid reaches an edge of the surface having a contour line that can be expressed as a differentiable function, the fluid becomes separated from the edge.

The flow of the shielding gas G following the guide surface 75c becomes separated from the nozzle 34 at the first edge 75d. The first edge 75d of the guide surface 75c is provided in a manner following a separating direction (output direction) Ds. The separating direction Ds is one example of a third direction, and is a direction that becomes more distanced from the central axis Ax than the converging direction Dc does, as the direction is extended further toward the negative direction of the Z axis. In other words, the separating direction Ds is a direction that deviates further to the outer side in the radial direction than the converging direction Dc does, as the separating direction Ds extended further toward the negative direction of the Z axis. The inclination of the separating direction Ds with respect to the central axis Ax is an angle θ2 illustrated in FIG. 4. The flow of the shielding gas G separated from the first edge 75d of the nozzle 34 generally flows in the separating direction Ds.

In this embodiment, the separating direction Ds is a direction that becomes more distanced from the central axis Ax, as being extended further toward the negative direction of the Z axis. Therefore, the flow of the shielding gas G separated from the first edge 75d of the nozzle 34 departs further away from the central axis Ax as the flow travels further in the negative direction of the Z axis. In other words, the flow of the shielding gas G spreads as the shielding gas G travels further in the negative direction of the Z axis. A part of the shielding gas G may flow in the direction approaching the central axis Ax, as the shielding gas G travels further in the negative direction of the Z axis, due to factors such as a pressure or slight Coanda effect.

Streams of the shielding gas G spread as they flow, and thus collision among them is reduced. Therefore, the shielding gas G maintains a laminar flow until the gas reaches the object 2, and then flows along the object 2. Because the laser beam L or the molten region 2c is surrounded by the shielding gas G maintaining a laminar flow, it is possible to reduce the chances of the external air getting inside the shielding gas G and reacting with the molten region 2c.

Figure 5:
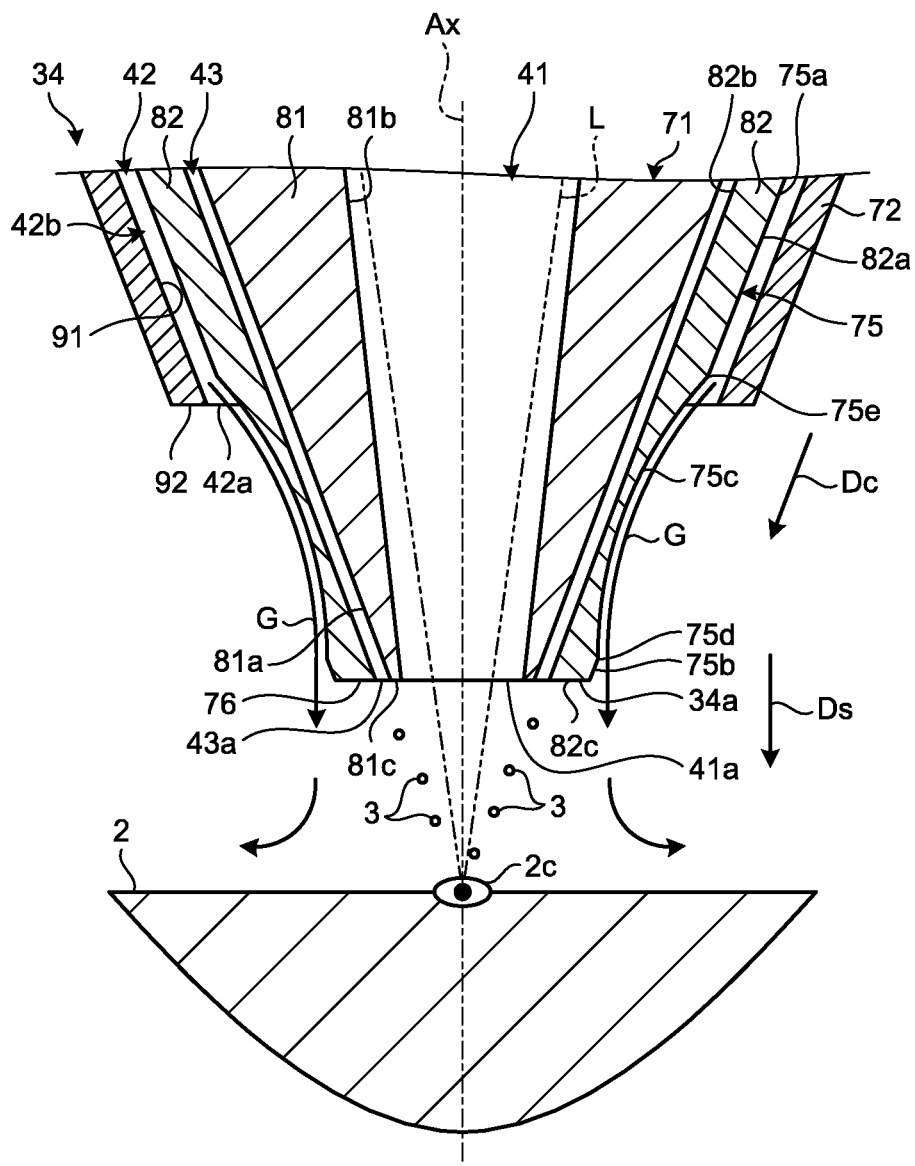
FIG. 5 is an exemplary sectional view illustrating a nozzle and an object according to a modification of the first embodiment.

FIG. 5 is an exemplary sectional view illustrating the nozzle 34 and the object 2 according to the modification of the first embodiment. As illustrated in FIG. 5, the length of the second surface 75b in the axial direction may be quite shorter than the length of the guide surface 75c. Furthermore, the inclination of the tangent plane on the first edge 75d with respect to the central axis Ax may be 0 degrees or near 0 degrees. In other words, the tangent plane on the first edge 75d may be substantially in parallel with the central axis Ax.

In the additive manufacturing apparatus 1 having the nozzle 34 according to the first embodiment, the ejection path 42 has the conical section 42b extending in the converging direction Dc that approaches nearer to the central axis Ax, as being extended further toward the negative direction of the Z axis, and the shielding gas G flows through the conical section 42b in the converging direction Dc. The guide surface 75c is exposed on the outer side in the radial direction at the first edge 75d, and the guide surface 75c is along the separating direction Ds at the first edge 75d, the separating direction Ds being a direction that becomes more distanced from the central axis Ax than the converging direction Dc does, as the separating direction Ds is extended further toward the negative direction of the Z axis. The shielding gas G in the ejection path 42 or the shielding gas G ejected from the ejection opening 42a flows along the guide surface 75c and becomes separated from the nozzle 34 at the first edge 75d. In this manner, the shielding gas G flows along the guide surface 75c due to the Coanda effect, for example, and becomes separated from the nozzle 34 at the first edge 75d, which extends along the separating direction Ds. The shielding gas G separated from the nozzle 34 flows in the separating direction Ds. In this manner, compared with a configuration in which the shielding gas G is ejected in the converging direction Dc, it is possible to reduce collision among the streams of the shielding gas G, caused by the sudden convergence of the shielding gas G ejected from the ejection opening 42a. Therefore, it is possible to reduce the chances of the external air getting inside the shielding gas G, due to a turbulence caused by the shielding gas G ejected from the ejection opening 42a. In other words, because the inside of the shielding gas G ejected from the ejection opening 42a is isolated from the outside, it is possible to reduce the chances of the laser beam L causing a reaction between the object 2 and the external air, for example.

Furthermore, the guide surface 75c is exposed on the outer side in the radial direction at least at the first edge 75d. In other words, because the Coanda effect enables the flow of the shielding gas G to be guided along the guide surface 75c, it is not necessary to cover the entire guide surface 75c from the outer side of the radial direction. Therefore, the inclination of the direction in which the shielding gas G flows with respect to the central axis Ax can be set to any desired inclination without covering the guide surface 75c. In this manner, the size of the nozzle 34 in the radial direction can be further reduced. Hence, for example, it is possible to suppress accumulation of the heat generated by the object 2 being irradiated with the laser beam L between the nozzle 34 and the object 2, and to suppress attachment of spatters emitted from the object 2 or the material 3 onto the nozzle 34.

The guide surface 75c is a curving surface having a convex shape curving toward the central axis Ax. With this structure, the size of the nozzle 34 in the radial direction can be further reduced, and, it is possible to suppress accumulation of the heat generated by the object 2 being irradiated with the laser beam L between the nozzle 34 and the object 2, and to suppress attachment of spatters emitted from the object 2 or the material 3 onto the nozzle 34, for example.

The angle formed by the normal vector of the tangent plane at each point on the guide surface 75c and the unit vector extending along the negative direction of the Z axis becomes larger at a position further on the side toward the negative direction of the Z axis. With this configuration, the flow of the shielding gas G travelling from the conical section 42b to the guide surface 75c can be brought closer to the separating direction Ds from the converging direction Dc smoothly, and to suppress generation of a turbulence of the shielding gas G, compared with a configuration in which the angle formed by the normal vector of the tangent plane on the guide surface 75c and the unit vector extending along the negative direction of the Z axis remains constant. Therefore, it is possible to reduce the chances of the external air getting inside the shielding gas G ejected from the ejection opening 42a.

The guide surface 75c has a part that is nearer to the central axis Ax than the first edge 75d is. In this manner, it is possible to further reduce the size of the nozzle 34 in the radial direction, to suppress accumulation of the heat generated by the object 2 being irradiated with the laser beam L between the nozzle 34 and the object 2, and to suppress attachment of spatters emitted from the object 2 onto the nozzle 34.

The second surface 75b extends from the first edge 75d and approaches the central axis Ax as the second surface 75b is extended further toward the negative direction of the Z axis. In this manner, the size of the nozzle 34 in the radial direction can be further reduced in the negative direction of the Z axis. Hence, for example, it is possible to suppress damages of the nozzle 34, resulting from the heat generated by or the spatters emitted from the object 2 being irradiated with the laser beam L.

The separating direction Ds is a direction becoming more distanced from the central axis Ax, as the separating direction Ds is extended further toward the negative direction of the Z axis. With this configuration, it is possible to reduce collision among the streams of the flow of the shielding gas G, caused by a convergence of the shielding gas G ejected from the ejection opening 42a, and to suppress generation of a turbulence of the shielding gas G. Therefore, it is possible to reduce the chances of the external air getting inside the shielding gas G ejected from the ejection opening 42a.

Second Embodiment

A second embodiment will now be explained with reference to FIG. 6. In the explanations of a plurality of embodiments below, components having the same functions as those having already been explained are appended with the reference numerals that are the same as those having already been explained, and explanations thereof will be sometimes omitted. The components given the same reference numerals do not necessarily have the same functions or properties in entirety, and may include different functions and properties depending on the embodiments.

Figure 6:
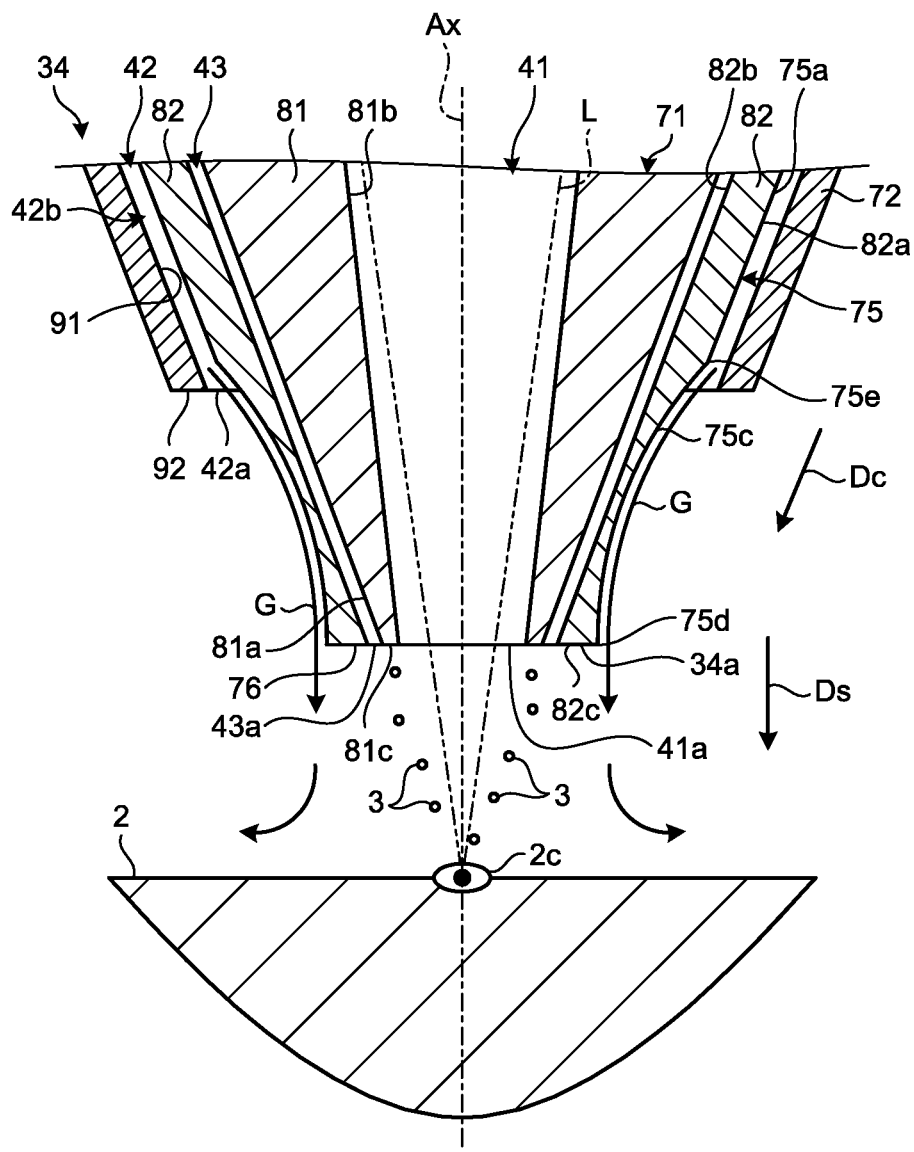
FIG. 6 is an exemplary sectional view illustrating a nozzle and an object according to a second embodiment.

FIG. 6 is an exemplary sectional view illustrating the nozzle 34 and the object 2 according to the second embodiment. As illustrated in FIG. 6, the outer circumferential surface 75 according to the second embodiment includes the first surface 75a and the guide surface 75c. The first edge 75d of the guide surface 75c is connected to the first end surface 76.

As explained above as the second embodiment, it is possible to omit the second surface 75b according to the first embodiment from the outer circumferential surface 75. With this configuration, it is possible to reduce the chances of the shielding gas G following the second surface 75b and flowing in a direction approaching the central axis Ax.

Third Embodiment

Figure 7:
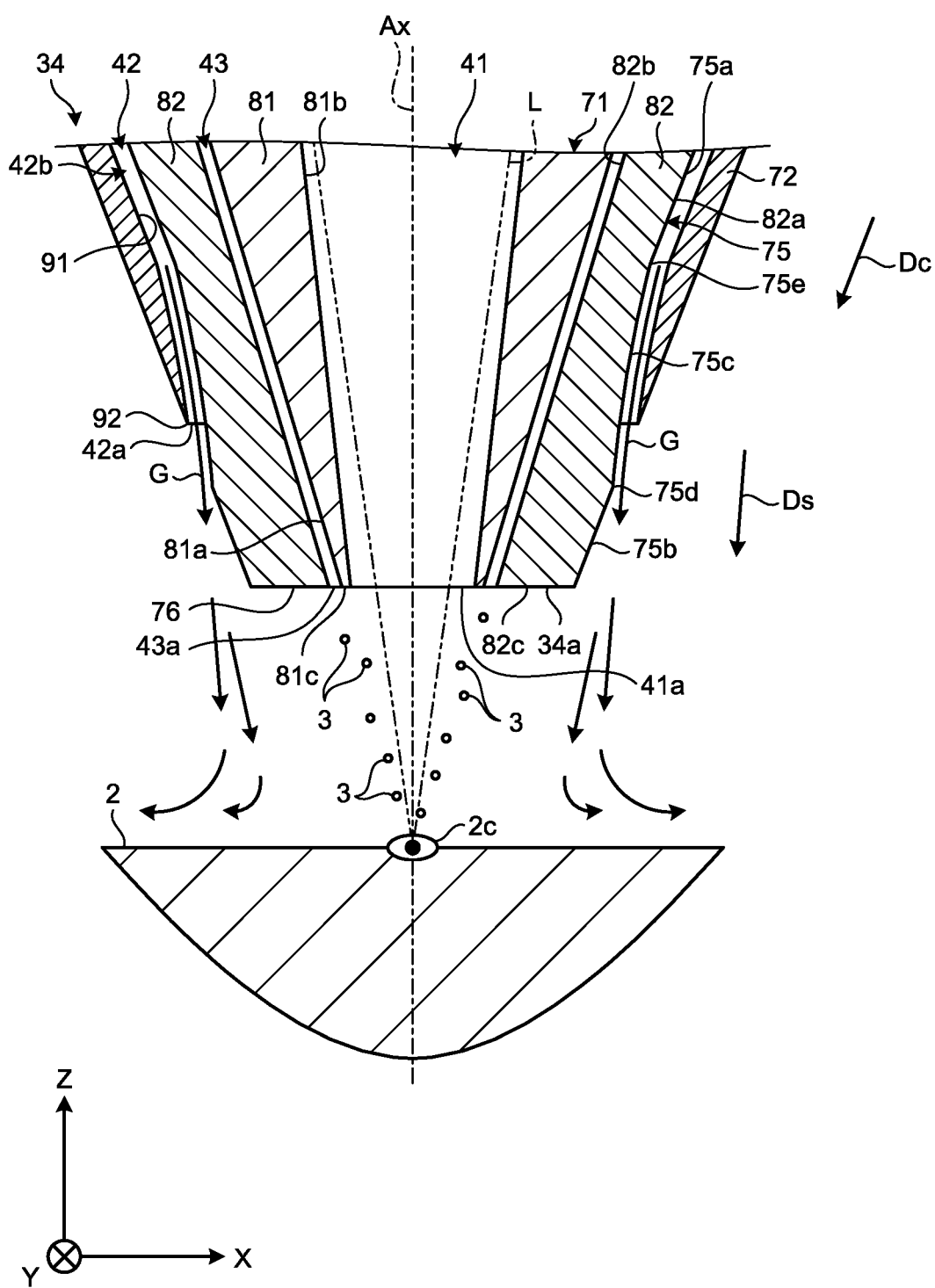
FIG. 7 is an exemplary sectional view illustrating a nozzle and an object according to a third embodiment.

A third embodiment will now be explained with reference to FIGS. 7 and 8. FIG. 7 is an exemplary sectional view illustrating the nozzle 34 and the object 2 according to the third embodiment. As illustrated in FIG. 7, the guide surface 75c according to the third embodiment is a curving surface having a convex shape curving toward the central axis Ax, but is not recessed with respect to the first surface 75a, and is provided between the first surface 75a and the second surface 75b.

In the third embodiment, the guide surface 75c continues smoothly to the first surface 75a. In other words, the first surface 75a and the guide surface 75c has a contour line that is smoothly continuous, and can be expressed as a differentiable function having continuity.

The inclination of the tangent plane on the second edge 75e with respect to the central axis Ax is equal to the angle $\theta 1$ that is the inclination of the tangent plane on the first surface 75a with respect to the central axis Ax. The inclination of the tangent plane on the guide surface 75c with respect to the central axis Ax becomes smaller, as the point of tangency is moved from the second edge 75e toward the first edge 75d.

The inclination of the tangent plane on the first surface 75a with respect to the central axis Ax is equal to the inclination of the tangent plane on the second surface 75b with respect to the central axis Ax, but the tangent plane on the second surface 75b is more distanced from the central axis Ax than the tangent plane on the first surface 75a is, at the same position in the axial direction.

Figure 8:
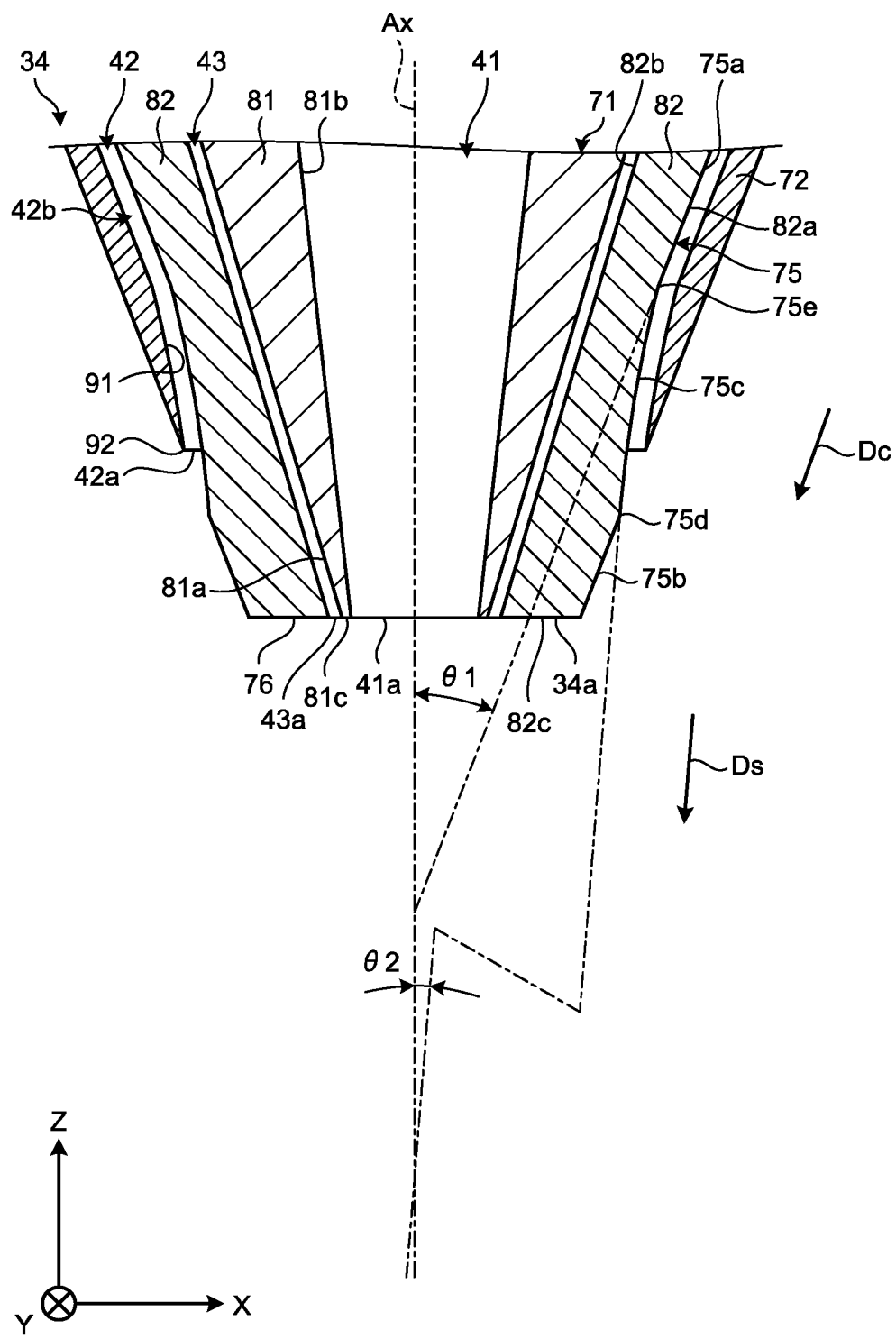
FIG. 8 is an exemplary sectional view illustrating the nozzle according to the third embodiment.

FIG. 8 is an exemplary sectional view illustrating the nozzle 34 according to the third embodiment. As illustrated in FIG. 8, the angle $\theta 2$ that is the inclination of the tangent plane on the first edge 75d with respect to the central axis Ax is smaller than the angle $\theta 1$ that is the inclination of the tangent plane on the first surface 75a and the second surface 75b with respect to the central axis Ax. In the third embodiment, the angle $\theta 1$ and the angle $\theta 2$ are both positive angles. Therefore, in the third embodiment, the separating direction Ds remains more distanced from the central axis Ax than the converging direction Dc is, as the separating direction Ds is extended further toward the negative direction of the Z axis, but still approaches the central axis Ax, as the separating direction Ds is extended further toward the negative direction of the Z axis, unlike in the first embodiment.

In the axial direction, the second end surface 92 of the second tubular portion 72 is nearer to the first edge 75d than the second edge 75e of the guide surface 75c. Therefore, a larger portion of the guide surface 75c is covered by the second tubular portion 72, and therefore, it is possible to suppress attachment of the spatter onto the guide surface 75c.

In the additive manufacturing apparatus 1 having the nozzle 34 according to the third embodiment explained above, the guide surface 75c continues smoothly to the first surface 75a that is positioned in the conical section 42b. With this configuration, the flow of the shielding gas G travelling from the conical section 42b to the guide surface 75c can be brought closer to the separating direction Ds from the converging direction Dc smoothly, and therefore, it is possible to suppress the generation of a turbulence of the shielding gas G. Hence, it is possible to reduce the chances of the external air getting inside the shielding gas G ejected from the ejection opening 42a.

Fourth Embodiment

Figure 9:
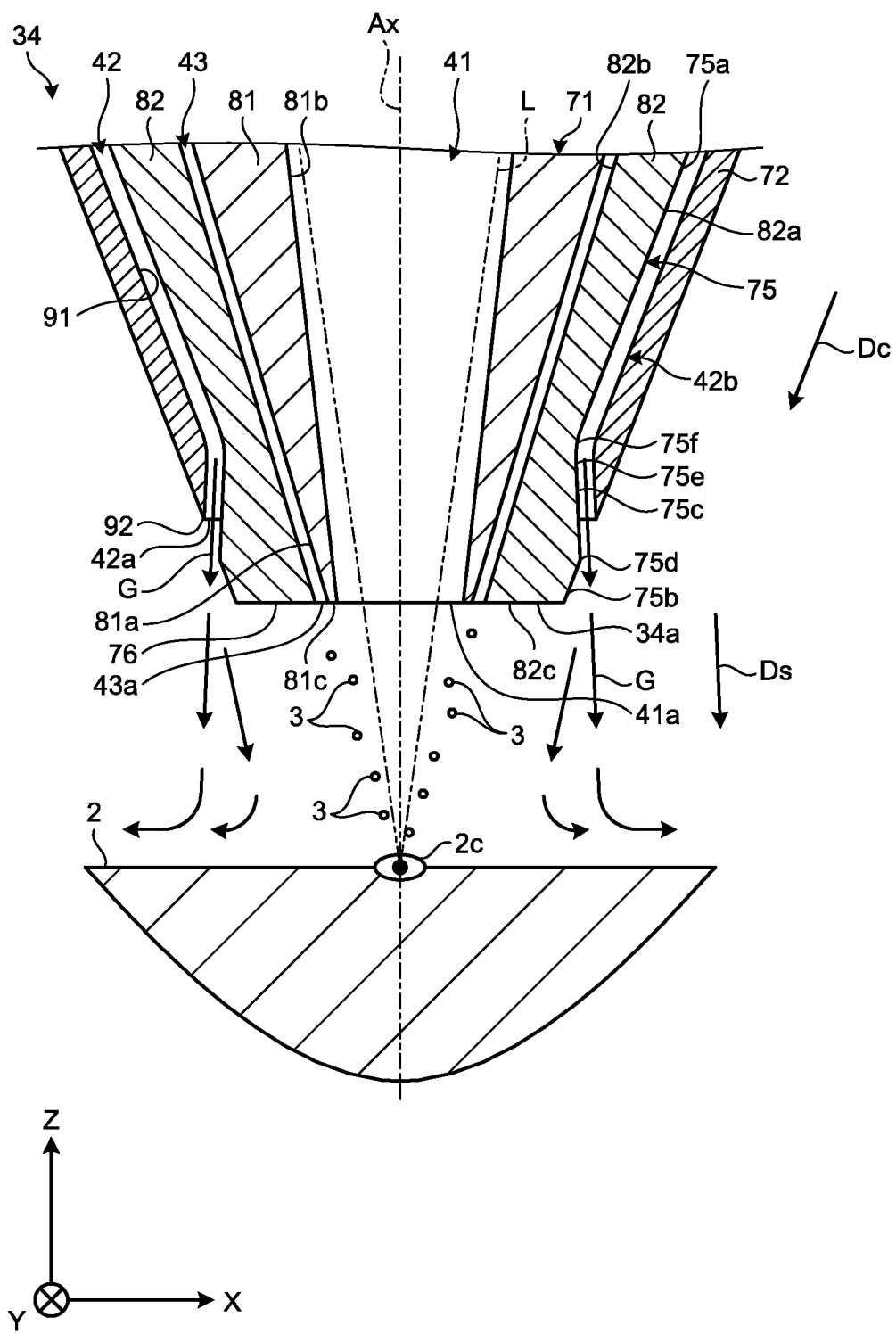
FIG. 9 is an exemplary sectional view illustrating a nozzle and an object according to a fourth embodiment.

A fourth embodiment will now be explained with reference to FIG. 9. FIG. 9 is an exemplary sectional view illustrating the nozzle 34 and the object 2 according to the fourth embodiment. As illustrated in FIG. 9, the outer circumferential surface 75 according to the fourth embodiment includes the first surface 75a, the second surface 75b, the guide surface 75c, and a connecting surface 75f. The connecting surface 75f is one example of a second curving surface.

In the fourth embodiment, the inclination of the tangent plane on the guide surface 75c with respect to the central axis Ax remains constant. In other words, the guide surface 75c is a conical or cylindrical surface. The guide surface 75c extends in the separating direction Ds.

The connecting surface 75f is a curving surface having a convex shape curving toward the central axis Ax, and is a substantially tubular curving surface that is continuous in the circumferential direction. The connecting surface 75f is positioned between the guide surface 75c and the first surface 75a. In other words, the connecting surface 75f is connected to the first surface 75a and is connected to the second edge 75e of the guide surface 75c.

The connecting surface 75f continues smoothly to the first surface 75a and continues smoothly to the guide surface 75c. In other words, in the cross section including the central axis Ax as illustrated in FIG. 9, the first surface 75a, the guide surface 75c, and the connecting surface 75f have a contour line that continues smoothly, and that can be expressed as a differentiable function having continuity.

In the additive manufacturing apparatus 1 having the nozzle 34 according to the fourth embodiment, the connecting surface 75f is curved in a convex shape curving toward the central axis Ax, and continues smoothly to the first surface 75a that is positioned in the conical section 42b, and also continues smoothly to the guide surface 75c. With this configuration, the flow of the shielding gas G travelling from the conical section 42b to the guide surface 75c via the connecting surface 75f can be brought closer to the separating direction Ds from the converging direction Dc smoothly, and therefore, it is possible to suppress the generation of a turbulence of the shielding gas G. Therefore, it is possible to reduce the chances of the external air getting inside the shielding gas G ejected from the ejection opening 42a.

In at least one of the embodiments explained above, the shielding gas G is one example of the fluid. However, any fluid such as other gas or water may be the one example. When water is ejected from the ejection path 42 as the fluid, the object 2 or the material 3 that is irradiated with the laser beam L can be cooled more easily.

According to at least one of the embodiments explained above, the second passage has the section extending in a second direction that approaches the central axis as the second direction is extended further toward the first direction, and the fluid flows through the section in the second direction. The guide surface is exposed on the outer side in the radial direction at the edge, and the guide surface is along a third direction at the edge, the third direction being a direction that becomes more distanced from the central axis than the second direction does, as the third direction is extended further toward the first direction. The flow of the fluid in the second passage or the flow of the fluid eject of the second open end follows the guide surface, and becomes separated from nozzle unit at the edge. The fluid separated from the nozzle unit flows in the third direction. With this configuration, compared with a configuration in which the fluid is ejected in the second direction, it is possible to reduce collision among the streams of the fluid flow, caused by a sudden convergence of the fluid ejected from the second open end. Therefore, it is possible to reduce the chances of the external air getting inside the fluid, due to a turbulence in the fluid having been ejected from the second open end.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A nozzle comprising:
   a nozzle unit that is provided with a first passage through which an energy ray passes, and a second passage through which fluid passes; and
   a guide surface that is provided to the nozzle unit, wherein
   the first passage extends along an axis, and includes a first open end that is positioned on one end of the first passage in a first direction along the axis, and that opens to outside of the nozzle unit,
   the second passage includes a second open end that is positioned on one end of the second passage in the first direction, that opens to the outside of the nozzle unit, and that is more distanced from the axis than the first open end is, on an outer side in a radial direction, and a section that is positioned upstream of the second open end, that extends in a second direction, and through which the fluid flows in the second direction,
   the guide surface has an edge that is positioned on one end of the guide surface in the first direction, is exposed on the outer side in the radial direction at least at the edge, and is along a third direction at the edge,
   the guide surface allows a flow of the fluid in the second passage or a flow of the fluid ejected from the second open end to follow the guide surface and then to become separated from the nozzle unit at the edge, and flow in the third direction, and
   the third direction is any one of:
   an approaching direction in which the fluid separated from the edge approaches the axis diagonally while flowing, an angle between the axis and the approaching direction being smaller than an angle between the axis and the second direction,
   a parallel direction to the axis, and
   a distanced direction in which the fluid separated from the edge is distanced diagonally from the axis while flowing.

2. The nozzle according to claim 1, wherein at least a part of the guide surface is positioned inside the second passage.

3. The nozzle according to claim 1, wherein the second direction approaches the axis diagonally.

4. The nozzle according to claim 1, wherein the guide surface has a first curving surface having a convex shape curving toward the axis.

5. The nozzle according to claim 4, wherein an angle between a normal vector of a tangent plane at each point of the guide surface and a unit vector of the first direction increases as the point is moved further toward the first direction.

6. The nozzle according to claim 1, wherein the guide surface has a part that is nearer to the axis than the edge is.

7. The nozzle according to claim 1, further comprising a reduced surface that is provided to the nozzle unit, and that extends from the edge to approach the axis diagonally.

8. The nozzle according to claim 1, wherein the third direction is the approaching direction.

9. The nozzle according to claim 1, further comprising an inner surface that is provided to the nozzle unit, that is positioned in the section, and that faces an outer side of the nozzle unit in the radial direction, wherein
   the guide surface continues smoothly to the inner surface.

10. The nozzle according to claim 3, further comprising:
    an inner surface that is provided to the nozzle unit, that is positioned in the section, and that faces an outer side of the nozzle unit in the radial direction; and a second curving surface that has a convex shape curving toward the axis, that continues smoothly to the inner surface, and that continues smoothly to the guide surface.

11. A processing apparatus comprising:
the nozzle according to claim 1;
an optical device that supplies the energy ray into the first passage the optical device including an oscillator; and
a fluid feeder that supplies the fluid into the second passage.

12. An additive manufacturing apparatus comprising:
the nozzle according to claim 1;
an optical device that supplies the energy ray into the first passage the optical device including an oscillator:
a fluid feeder that supplies the fluid into the second passage; and
a material feeder that supplies powder material into the nozzle, wherein
the nozzle unit is provided with a third passage through which the powder material is passed,
the third passage includes a third open end that is positioned on one end of the third passage in the first direction, that opens to the outside of the nozzle unit, and that is more distanced from the axis than the first open end is, on an outer side in the radial direction,
the second open end is more distanced from the axis than the third open end is, on the outer side in the radial direction, and
the nozzle melts or sinters the powder material ejected from the third open end with the energy ray.

\* \* \* \* \*